(12) United States Patent
Kamijo et al.

(10) Patent No.: US 7,791,574 B2
(45) Date of Patent: Sep. 7, 2010

(54) ELECTRO-OPTICAL DEVICE AND ELECTRONIC APPARATUS

(75) Inventors: Kimitaka Kamijo, Nagano (JP); Keiji Takizawa, Nagano (JP)

(73) Assignee: Seiko Epson Corporation (JP)

( * ) Notice: Subject to any disclaimer, the term of this patent is extended or adjusted under 35 U.S.C. 154(b) by 878 days.

(21) Appl. No.: 11/208,895

(22) Filed: Aug. 22, 2005

(65) Prior Publication Data

US 2006/0044239 A1    Mar. 2, 2006

(30) Foreign Application Priority Data

Sep. 1, 2004    (JP)    ............... 2004-253840

(51) Int. Cl.
  *G09G 3/34*    (2006.01)
  *G06F 3/038*    (2006.01)
  *G02F 1/1335*    (2006.01)

(52) U.S. Cl. ................... 345/88; 349/114; 349/107
(58) Field of Classification Search ........... 345/695, 345/89, 82, 88, 204, 81, 90; 349/106, 107, 349/114
  See application file for complete search history.

(56) References Cited

U.S. PATENT DOCUMENTS

| 6,215,538 | B1 * | 4/2001 | Narutaki et al. ............. 349/106 |
| 6,636,286 | B1 * | 10/2003 | Baek ............................ 349/114 |
| 6,812,981 | B2 | 11/2004 | Yoshino | |
| 6,950,156 | B1 * | 9/2005 | Yoshida ........................ 349/106 |
| 2003/0151712 | A1 * | 8/2003 | Inoue et al. ................... 349/139 |
| 2004/0125285 | A1 * | 7/2004 | Arai et al. .................... 349/113 |
| 2005/0140906 | A1 * | 6/2005 | Baek ............................ 349/144 |
| 2005/0225574 | A1 * | 10/2005 | Brown et al. ................. 345/694 |
| 2005/0237450 | A1 * | 10/2005 | Hu et al. ...................... 349/108 |
| 2006/0017866 | A1 | 1/2006 | Morimoto et al. | |

FOREIGN PATENT DOCUMENTS

| JP | 08-211223 | 8/1996 |
| JP | 2000-010117 | 1/2000 |
| JP | 2002-55337 | 2/2002 |
| JP | 2004-077544 | 3/2004 |
| JP | 2006-58851 | 3/2006 |

OTHER PUBLICATIONS

Merriam-Webster Collegiate Dictionary, tenth edition, 1997. Entries for "color" and "transparent".*

* cited by examiner

*Primary Examiner*—Amr Awad
*Assistant Examiner*—Liliana Cerullo
(74) *Attorney, Agent, or Firm*—Harness, Dickey & Pierce, P.L.C.

(57) ABSTRACT

There is provided an electro-optical device including pixels arranged in a matrix, each pixel having a plurality of color-display sub-pixels corresponding to a plurality of colors and a monochrome-display sub-pixel. The color-display sub-pixel and the monochrome-display sub-pixel can perform gray-scale display independently. One of the color-display sub-pixel and the monochrome-display sub-pixel displays images in a transmissive mode in which light emitted from a light source is modulated, while the other sub-pixel displays images in a reflective mode in which light incident from outside is modulated.

7 Claims, 7 Drawing Sheets

ELECTRO-OPTICAL DEVICE AND ELECTRONIC APPARATUS

RELATED APPLICATIONS

This application claims priority to Japanese Patent Application No. 2004-253840 filed Sep. 1, 2004 which is hereby expressly incorporated by reference herein in its entirety.

BACKGROUND OF THE INVENTION

1. Technical Field

The present invention relates to an electro-optical device capable of displaying images in transmissive and reflective modes, and to an electronic apparatus having the electro-optical device.

2. Related Art

In active-matrix-type electro-optical devices, pixels having a plurality of color-display sub-pixels respectively corresponding to a plurality of colors are arranged in a matrix. Also, images can be displayed in transmissive and reflective modes if a reflective layer is formed on each sub-pixel and a light transmissive portion is formed by removing a part of the reflective layer (for example, see Japanese Unexamined Patent Application Publication No. 2004-77544).

However, a transflective electro-optical device disclosed in Japanese Unexamined Patent Application Publication No. 2004-77544, in which external light is required to display color images in a reflective mode, has a problem in that the amount of light is limited. As a result, high-quality color images cannot be obtained, and thus it is difficult to read displayed information.

SUMMARY

An advantage of the invention is that it provides an electro-optical device in which information displayed in a reflective mode can be easily read, and an electronic apparatus having the electro-optical device.

According to an aspect of the invention, there is provided an electro-optical device including pixels arranged in a matrix, each pixel having a plurality of color-display sub-pixels corresponding to a plurality of colors and a monochrome-display sub-pixel. The color-display sub-pixel and the monochrome-display sub-pixel can perform gray-scale display independently. One of the color-display sub-pixels and the monochrome-display sub-pixel displays an image in a transmissive mode in which light emitted from a light source is modulated, while the other type of sub-pixel displays an image in a reflective mode in which light incident from outside is modulated.

According to the invention, for example, it is possible to display color images in a transmissive mode by means of the color-display sub-pixels and to display monochrome images in a reflective mode by means of the monochrome-display sub-pixel. In this case, since external light is required to display images in the reflective mode, the amount of light is limited. However, since monochrome images are displayed in the reflective mode, the light will not transmit a color filter layer unlike a case in which color images are displayed. Thus, since light loss upon transmitting the color filter layer does not occur in the reflective mode, bright images can be displayed so that displayed information can be easily read. Also, color signals displayed in the monochrome mode are displayed in gray-scale which is difficult to be discriminated. However, according to the invention, different image signals can be supplied to the monochrome-display sub-pixel and the color-display sub-pixel. Accordingly, it is possible to display high-quality color images in the transmissive mode and to display high-quality monochrome images in the reflective mode.

In the electro-optical device according to the aspect of the invention, it is preferable that, in each pixel, different image signals be supplied to the color-display sub-pixels and the monochrome-display sub-pixel, respectively.

Further, in the electro-optical device according to the aspect of the invention, it is preferable that the color-display sub-pixel display an image in a transmissive mode and the monochrome-display sub-pixel display an image in a reflective mode.

In this case, it is preferable that an electro-optical material layer interposed between a pair of substrates to modulate light be further provided. Further, it is preferable that the electro-optical material layer be thicker in the color-display sub-pixels than in the monochrome-display sub-pixel. Light transmits the electro-optical material layer twice in the reflective mode, while light transmits the electro-optical material layer once in the transmissive mode. However, by making the electro-optical material layer in the color-display sub-pixel thicker, it is possible to optimize retardation both in the color-display sub-pixel and in the monochrome-display sub-pixel.

Furthermore, in the electro-optical device according to the aspect of the invention, it is preferable that, when the sub-pixels are electrically connected to signal lines through pixel switching elements, respectively, the respective sub-pixels have the same sub-pixel area with respect to each switching element. Also, it is preferable that, when the color-display sub-pixels and the monochrome-display sub-pixel are electrically connected to signal lines through pixel switching elements, respectively, the color-display sub-pixels and the monochrome-display sub-pixel be equal in the number of switching elements with respect to an area of the sub-pixel. With such a configuration, when a TFD element is used as a non-linear element, an equal capacitance ratio can be obtained both in the transmissive mode and in the reflective mode, so that an equal driving voltage can be applied. Also, when the capacitance ratio can be made to be approximately equal in both modes, the same effect can be achieved even though the areas are not equal to each other.

Moreover, in the electro-optical device according to the aspect of the invention, it is preferable that, in the pixel, among four sub-pixels arranged in a lattice shape, three sub-pixels be the color-display sub-pixels and the remaining one sub-pixel be the monochrome-display sub-pixel.

In addition, in the electro-optical device according to the aspect of the invention, it is preferable that, in the pixel, a row on which the three color-display sub-pixels are arranged and a row on which the monochrome-display sub-pixels are arranged be provided parallel to each other.

Further, according to another aspect of the invention, the electro-optical device according to the invention can be applied to an electronic apparatus such as mobile phones or mobile computers.

BRIEF DESCRIPTION OF THE DRAWINGS

The invention will be described with reference to the accompanying drawings, wherein like numbers reference like elements, and wherein.

DESCRIPTION OF THE EMBODIMENTS

Figure 1:
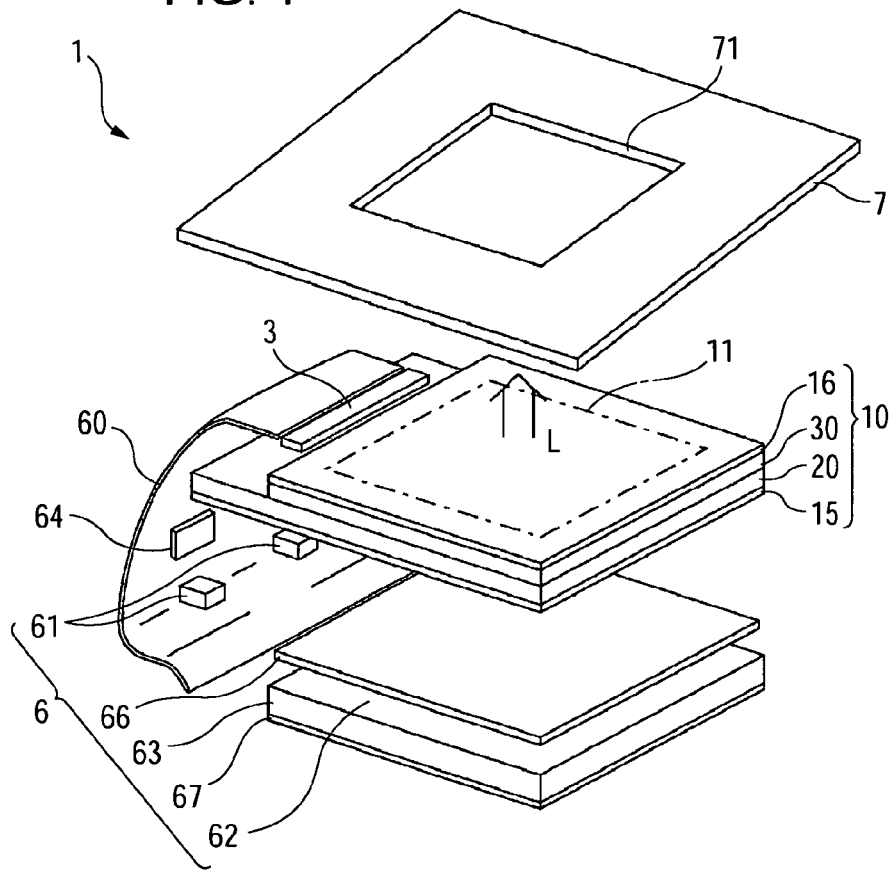
FIG. 1 is an exploded perspective view of an electro-optical device according to the invention.

Hereinafter, preferred embodiments of the invention will be described with reference to the accompanying drawings. The scale of each member has been adjusted in order to have a recognizable size in the drawings described below.

First Embodiment

Overall Configuration of Electro-Optical Device

Figure 2:
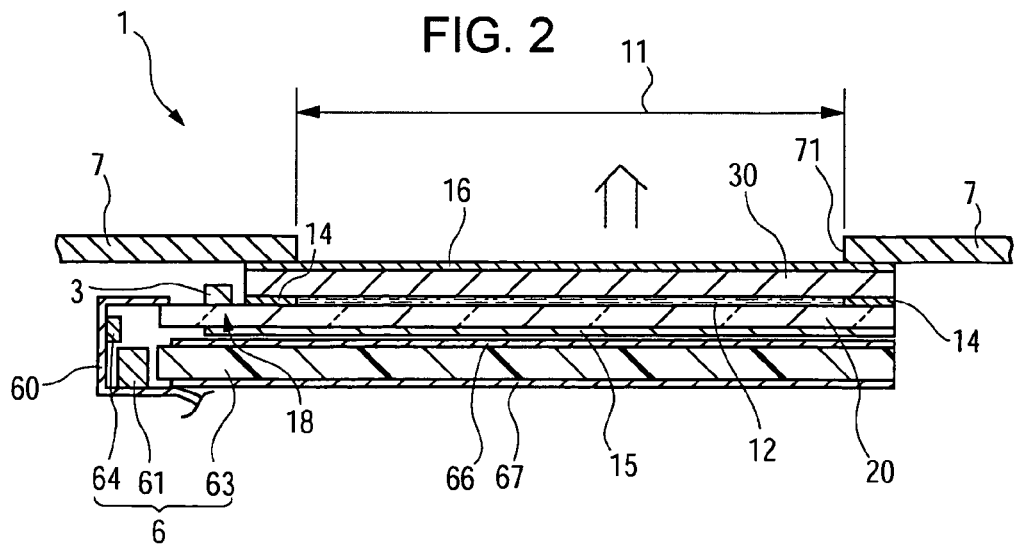
FIG. 2 is a cross-sectional view of the electro-optical device shown in FIG. 1.
Figure 3:
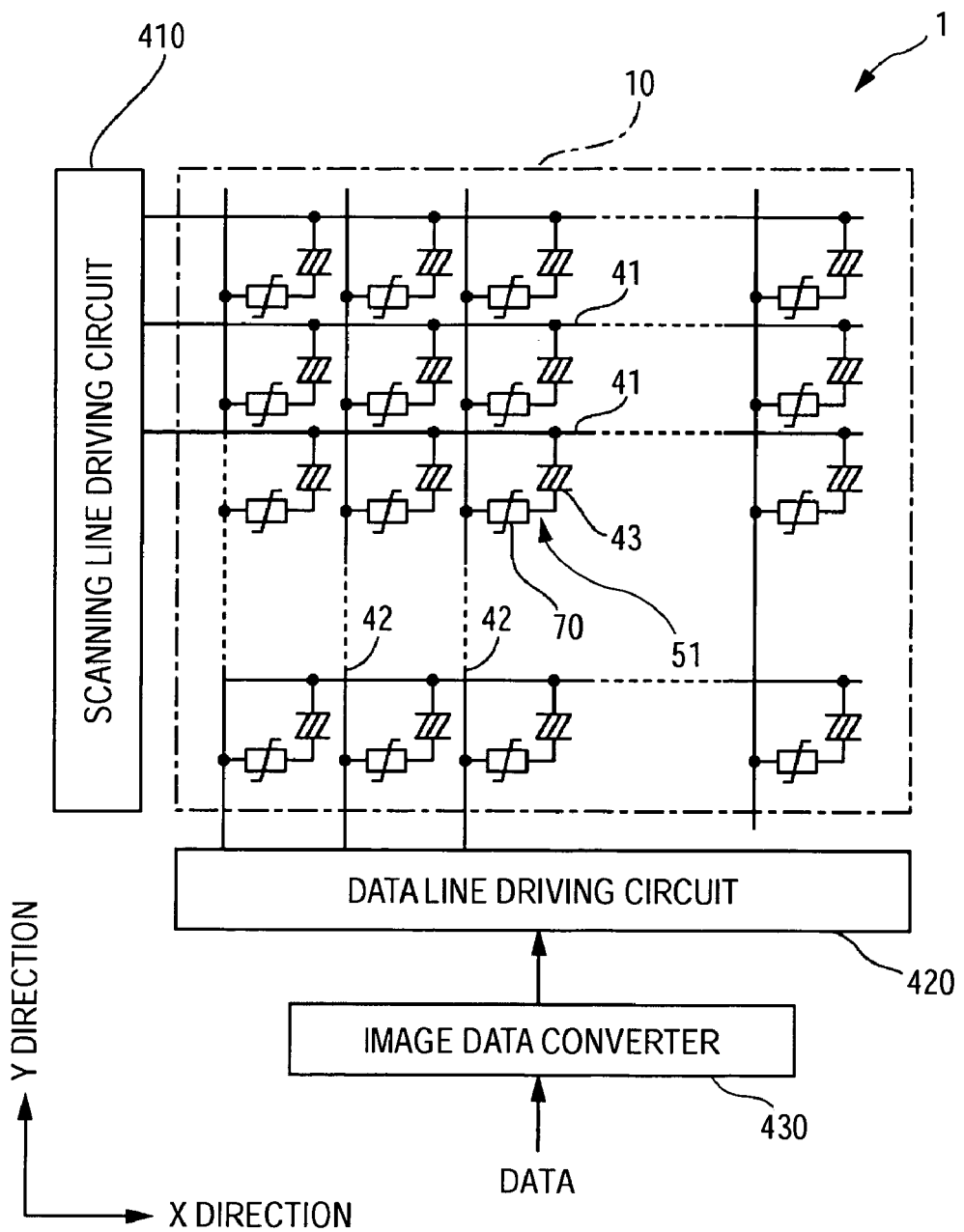
FIG. 3 is a block diagram showing an electrical configuration of the electro-optical device shown in FIG. 1.
Figure 4:
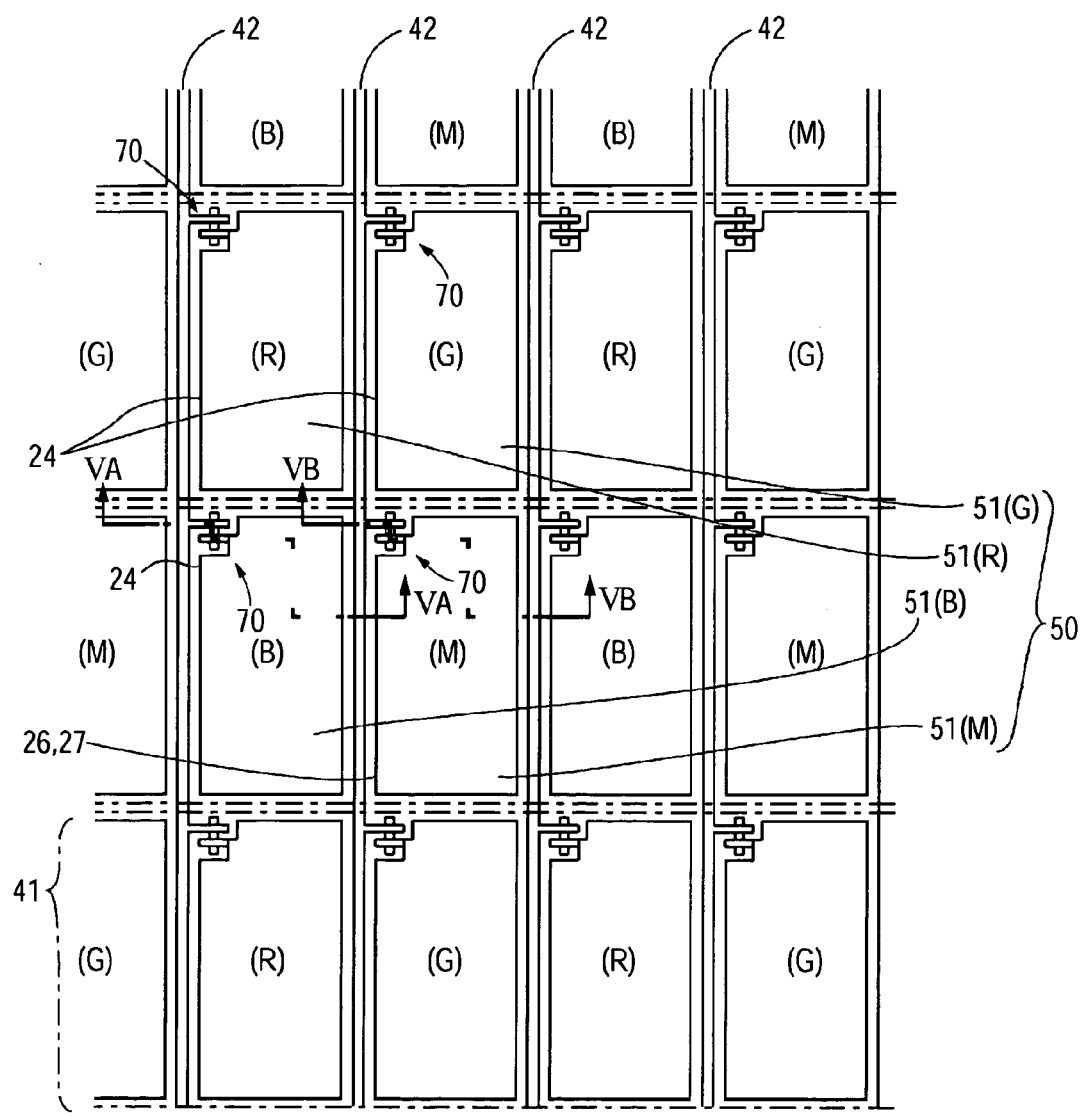
FIG. 4 is an explanatory view showing the configuration of a pixel in plan view, in an electro-optical device according to a first embodiment of the invention.

FIG. 1 is an exploded perspective view of an electro-optical device to which the invention is applied. FIG. 2 is a cross-sectional view of the electro-optical device shown in FIG. 1. FIG. 3 is a block diagram showing an electrical configuration of the electro-optical device shown in FIG. 1. FIG. 4 is an explanatory view showing a configuration of a pixel in plan view, in an electro-optical device according to a first embodiment of the invention. In FIG. 4, although a pixel-electrode is formed to cover a TFD element, a part of the pixel electrode is cut away to show the TFD element so that the presence of a component can be easily understood.

As shown in FIGS. 1 and 2, an electro-optical device 1 according to the present embodiment includes a backlight 6, an electro-optical panel 10, and a light-shielding frame 7, which are stacked in the above order. The frame 7 includes a light transmissive area 71 formed corresponding to an image display area 11 of the electro-optical panel 10 so that a user can view images displayed in the image display area 11 of the electro-optical panel 10.

The backlight 6 includes a plurality of LEDs 61 (light emitting devices) serving as light sources, and a light-guiding plate 63 which is made of resin and in which light emitted from the LEDs 61 is incident on a lateral side thereof to be emitted from a light-emitting surface 62 thereof. The light-emitting surface 62 of the light-guiding plate 63 and the electro-optical panel 10 are provided opposite to each other. In the backlight 6, for example, a light-scattering sheet 66 is provided on the light-emitting surface 62 side of the light-guiding plate 63, and a prism sheet 67 is provided on the opposite side thereof.

The electro-optical panel 10 is, for example, an active-matrix-type color liquid crystal panel. A polarizer 15, which is provided on a side on which light is incident, and a polarizer 16, which is provided on a side from which light is emitted, are stacked on both sides of the electro-optical panel 10. As will be described later, the electro-optical panel 10 includes an element substrate 20, on which pixel electrodes or TFD elements are formed, a counter substrate 30, on which counter electrodes or color filters are formed, and a liquid crystal layer 12 interposed therebetween. The element substrate 20 and the counter substrate 30 are bonded by a sealing material 14 to have a predetermined distance therebetween. In the present embodiment, the counter substrate 30 is provided at a side to which display light (denoted by arrow L) is emitted, while the element substrate 20 is provided at the opposite side.

The element substrate 20 is larger than the counter substrate 30. On an extended area 18 of the element substrate 20 extended from the counter substrate 30, a panel driving IC 3 is mounted in a COG (chip on glass) manner. The panel driving IC 3 includes a data line driving circuit 420 or a scanning line driving circuit 410, and a power, supply circuit generating voltage to be used in the electro-optical device 1. Also, an end portion of a flexible substrate 60 for supplying signals or electrical power to the panel driving IC 3 is mounted on the extended area 18 of the electro-optical panel 10. On the flexible substrate 60, LEDs 61 of the backlight 6 are mounted and an LED driving IC 64 including an LED driving circuit for driving the LEDs 61 is also mounted. The LED driving IC 64 supplies current with a predetermined duty ratio. The flexible substrate 60 is disposed from the electro-optical panel 10 to the light-guiding plate 63. Also, the flexible substrate 60 is disposed such that the axis of emitted light from the LED 61 is parallel to the lateral side of the light-guiding plate 63.

As shown in FIGS. 3 and 4, in the electro-optical panel 10, a plurality of scanning lines 41 are arranged in a row direction (X-direction), while a plurality of data lines 42 are arranged in a column direction (Y-direction). Also, a plurality of sub-pixels 51 are arranged in a matrix to correspond to the respective intersections between the scanning lines 41 and the data lines 42. In each sub-pixel 51, a liquid crystal layer 43, composed of nematic liquid crystal, and a TFD element 70, which is a two-terminal-type active element, are connected in series to each other. Although the liquid crystal layer 43 is connected to the scanning line 41 and the TFD element 70 is connected to the data line 42 in the present embodiment, the liquid crystal layer 43 may be connected to the data line 42 and the TFD element 70 may be connected to the scanning line 41. In either case, the scanning line 41 is driven by a scanning line driving circuit 410 and the data line 42 is driven by a data line driving circuit 420.

As will be described below, the electro-optical panel 10 according to the present embodiment can display both color images and monochrome images. When the color images and the monochrome images are displayed, different image signals are supplied, so that optimum images can be displayed in either case. For this reason, with respect to the data driving circuit 420, an image data converter 430, which converts a signal for displaying the color image to a signal for displaying the monochrome image, is included in the panel driving IC 3.

Detailed Configuration of Pixel

Figure 5A:
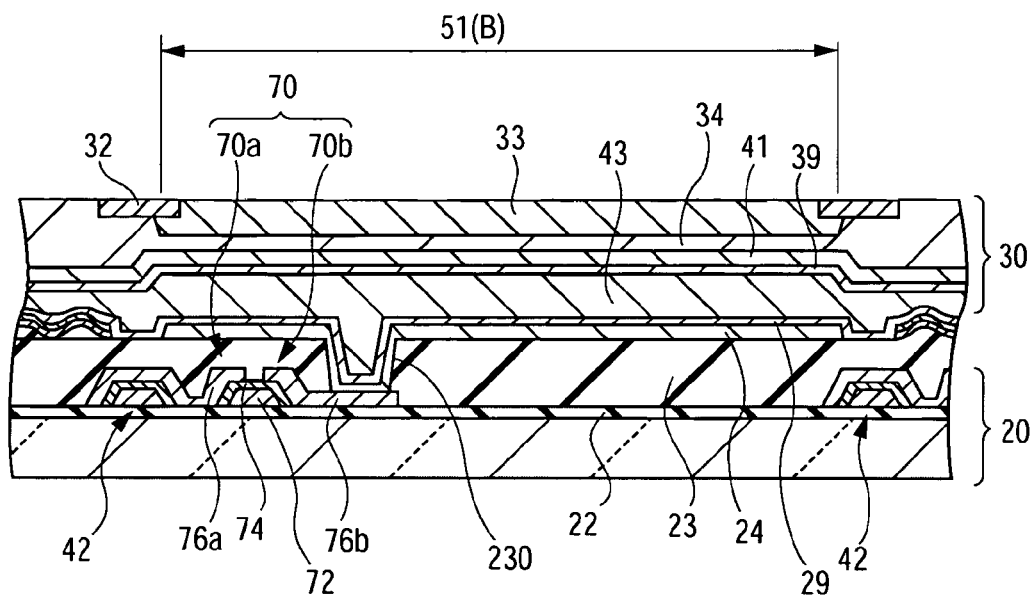
FIG. 5A is a cross-sectional view of a color-display sub-pixel taken along line VA-VA of FIG. 4, in an electro-optical device according to the invention.
Figure 5B:
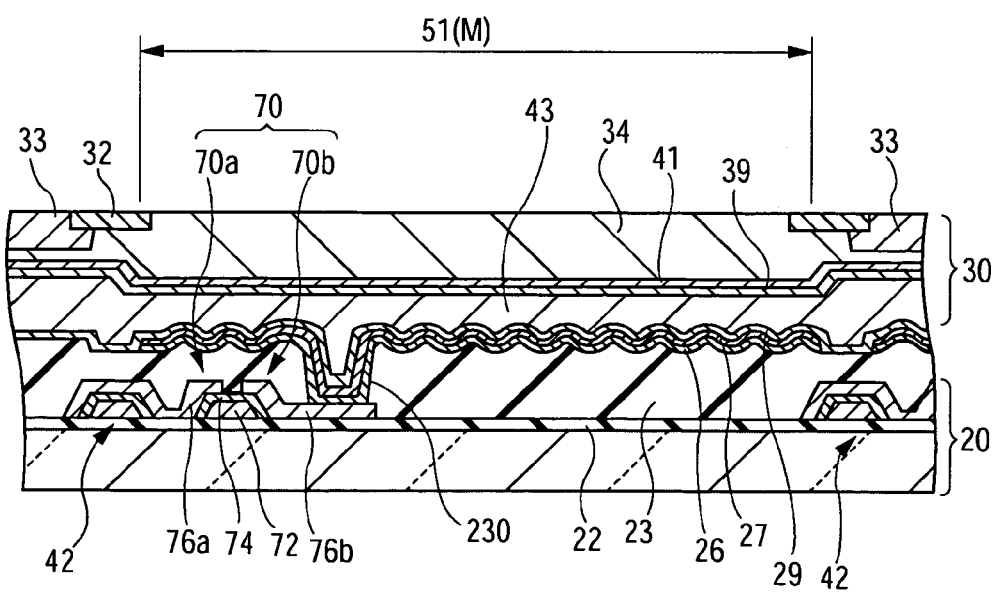
FIG. 5B is a cross-sectional view of a monochrome-display sub-pixel taken along line VB-VB of FIG. 4, in the electro-optical device according to the invention.

FIGS. 5A and 5B are a cross-sectional view of a color-display sub-pixel taken along line VA-VA of FIG. 4 and a cross-sectional view of a monochrome-display sub-pixel taken along line VB-VB of FIG. 4, respectively, in an electro-optical device according to the invention.

As shown in FIG. 4, in the electro-optical device 1 according to the present embodiment, a single pixel 50 includes color-display sub-pixels 51(R), 51(G), and 51(B) corresponding to red (R), green (G), and blue (B), respectively, and a monochrome-display sub-pixel 51(M). That is, the single pixel 50 is composed of four sub-pixels arranged in a lattice shape, each of which has an equal area. Three of them are color-display sub-pixels 51(R), 51(G), and 51(B), and the remaining one is a monochrome-display sub-pixel 51(M).

The respective sub-pixels 51(R), 51(G), 51(B), and 51(M) are connected to the data lines 42 through the TFD elements 70, respectively. Accordingly, predetermined image signals can be supplied to the respective sub-pixels 51(R), 51(G), 51(B), and 51(M). That is, in each pixel 50, different image signals can be supplied to the color-display sub-pixels 51(R), 51(G), and 51(B) and the monochrome-display sub-pixel 51(M).

As will be described below with reference to FIGS. 5A and 5B, the present embodiment is configured such that the color-display sub-pixels 51(R), 51(G), and 51(B) display images in a transmissive mode in which light emitted from the backlight 6 is modulated, and the monochrome-display sub-pixel 51(M) displays images in a reflective mode in which light incident from outside is modulated.

As shown in FIG. 5A, in the color-display sub-pixels 51(R), 51(G), and 51(B), a transmissive base film 22 is formed on a surface of a transmissive member, such as glass, of the element substrate 20. On a surface of the base film 22, a plurality of data lines 42 and a plurality of TFD elements 70 connected to the data lines 42 are formed. Also, on surfaces of the data lines 42 and the TFD elements 70, an interlayer insulation film 23 made of a transmissive photosensitive resin is formed. On a surface of the interlayer insulation film 23, transmissive pixel electrodes 24 made of ITO (Indium Tin Oxide) and an alignment film 29 are formed in this order. Contact holes 230 are formed on the interlayer insulation film 23. The transmissive pixel electrodes 24 are electrically connected to the TFD elements 70 through the contact holes 230, respectively. In the counter substrate 30, a light-shielding film 32 and a color filter layer 33 having a predetermined color are formed on a surface of a transmissive member such as glass. On surfaces of the light-shielding film 32 and the color filter layer 33, a transmissive planarization film 34, transmissive scanning lines 41 (counter electrodes) made of, for example, stripe-shaped ITO, and an alignment film 39 made of polyimide resin are formed in this order. Thus, each color-display sub-pixel 51(R), 51(G), and 51(B) is configured to correspond to any one of colors red (R), green (G), and blue (B), according to which color of red (R), green (G), and blue (B) is selected in the color filter layer 33. Also, reflective layers are not formed on the color-display sub-pixels 51(R), 51(G), and 51(B).

The TFD element 70 includes a first TFD element 70a and a second TFD element 70b. On an insulation film 22 formed on a surface of the element substrate 20 are formed a first metallic film 72, an oxide film 74 which is made of an insulation material formed by performing anodic oxidation on the first metallic film 72, and second metallic films 76a and 76b which are formed on the oxide film 74 and are separated from each other. Also, the second metallic film 76a is used as the data line 42, while the second metallic film 76b is connected to the transmissive pixel electrode 24. The first TFD element 70a is composed of the second metallic film 76a/oxide film 74/first metallic film 72 in this order as viewed from the data line 42 side, i.e., a sandwich structure having metal (conductor)/insulator/metal (conductor). Thus, it has a bidirectional (positive/negative) diode switching characteristic. Meanwhile, the second TFD element 70b is composed of the first metallic film 72/oxide film 74/second metallic film 76b in this order as viewed from the data line 42 side. Thus, it has a diode switching characteristic opposite to that of first TFD element 70a. Accordingly, since the TFD element 70 is configured such that two diodes are serially connected in opposite directions to each other, the current-voltage non-linear characteristics become symmetrical both in the positive and negative directions, compared to a case of using a single diode. If the symmetrical non-linear characteristic is not required, a single TFD element 70 may be used. Also, the TFD element 70 is an example of a diode element. Other examples of the diode element include elements using a ZnO varistor or MSI (metal semi insulator), a combination of these elements, or such elements connected in series in opposite directions to each other or in parallel to each other.

As shown in FIG. 5B, in the monochrome-display sub-pixel 51(M), the base film 22 is formed on a surface of a transmissive member of the element substrate 20. On a surface of the base film 22, a plurality of data lines 42 and a plurality of TFD elements 70 connected to the data lines 42 are formed. Also, on surfaces of the data lines 21 and the TFD elements 40, the interlayer insulation film 23 made of a transmissive photosensitive resin is formed. On a surface of the interlayer insulation film 23, reflective pixel electrodes 26 (reflective layer) made of aluminum or silver, transmissive upper electrodes 27 made of IZO (indium zinc oxide), and an alignment film 29 are formed in this order. On a surface of the interlayer insulation film 23, unevenness is randomly formed. Also, unevenness is formed on a surface of the reflective pixel electrode 26. That is, if light reflected from the reflective pixel electrode 26 has a strong directionality, viewing angle dependency or the appearance of a background becomes noticeable. However, according to the present embodiment, when the interlayer insulation film 23 is formed on a lower layer of the reflective pixel electrode 26 using a photosensitive resin, an unevenness layer is formed by forming minute unevenness on the surface of the interlayer insulation film 23 to scatter light, thereby forming minute unevenness on the surface of the reflective pixel electrode 26. The interlayer insulation film 23 is composed of one or two photosensitive resin layers. Also, the contact hole 230 is formed on the interlayer insulation film 23. The reflective pixel electrode 26 is electrically connected to the TFD element 70 through the contact hole 230. In the counter substrate 30, a color filter layer is not formed in an area opposite to the reflective pixel electrode 26. A planarization film 34, stripe-shaped scanning lines 41 serving as counter electrodes, and an alignment film 39 made of polyimide resin are formed in this order in the counter substrate 30. The configuration of the TFD element 70 is the same as that shown in FIG. 5A and a detailed description thereof will thus be omitted herein.

Comparing the thickness of the planarization film 34 in the color-display sub-pixels 51(R), 51(G), and 51(B) shown in FIG. 5A with the thickness of the planarization film 34 in the monochrome-display sub-pixel 51(M) shown in FIG. 5B, the thickness of the planarization film 34 is small in the color-display sub-pixels 51(R), 51(G), and 51(B) and is large in the monochrome-display sub-pixel 51(M). Thus, although the color filter layer 33 is formed in the color-display sub-pixels 51(R), 51(G), and 51(B), the liquid crystal layer 43 is thick. Meanwhile, although the color filter layer 33 is not formed in the monochrome-display sub-pixel 51(M), the liquid crystal layer 43 is thin.

Operation and Main Effect of the Present Embodiment

In the electro-optical device 1 configured as described above, color images can be displayed in a transmissive mode using the color-display sub-pixels 51(R), 51(G), and 51(B)

and monochrome images can be displayed in a reflective mode using the monochrome-display sub-pixel 51(M). Such a mode conversion is performed by user operation or automatically in an electronic apparatus equipped with the electro-optical device 1. Here, such a mode conversion may occur while color images are being displayed in the transmissive mode or in the reflective mode. While the color images are being displayed, the monochrome-display sub-pixel 51(M) is turned off. Also, while the monochrome images are being displayed, the color-display sub-pixels 51(R), 51(G), 51(B) are turned off.

In the electro-optical device 1 configured as described above, since external light is used to display images in the reflective mode, the amount of light is limited. However, according to the present embodiment, since monochrome images are displayed in the reflective mode, the light is not transmitted through the color filter layer 33, unlike a case in which color images are displayed. Accordingly, since bright images can be displayed in the reflective mode, it is easy to read the displayed information.

Further, when an image is displayed in the monochrome mode using a color signal, it is displayed in a gray-scale level, which is difficult to be discriminated. However, according to the present embodiment, it is possible to supply to the monochrome-display sub-pixel 51(M) image signals different from those supplied to the color-display sub-pixels 51(R), 51(G), and 51(B). Accordingly, it is possible to display high-quality color images in the transmissive mode and to display high-quality monochrome images in the reflective mode.

Furthermore, according to the present embodiment, the thickness of the planarization film 34 is different in the color-display sub-pixels 51(R), 51(G), and 51(B) and the monochrome-display sub-pixel 51(M), so that the liquid crystal layer 43 is thick in the color-display sub-pixels 51(R), 51(G), and 51(B) and the liquid crystal layer 43 is thin in the monochrome-display sub-pixels 51(M). Accordingly, even though light is transmitted through the liquid crystal layer 43 twice in the reflective mode and only once in the transmissive mode, it is possible to optimize the retardation both in the color-display sub-pixels 51(R), 51(G), and 51(B) and in the monochrome-display sub-pixel 51(M) since the liquid crystal layer 43 is thicker in the color-display sub-pixels in which transmissive display is performed.

Moreover, according to the present embodiment, the ratio of the sub-pixel area to the number of the TFD elements 70 (the sub-pixel area per switching element) is the same in each of the respective sub-pixels 51(R), 51(G), 51(B), and 51(M). Accordingly, since an equal capacitance ratio can be obtained in the transmissive mode and the reflective mode, an equal driving voltage can be applied.

Configuration for Conversion to Monochrome Image Data

According to a first method of such a conversion, when conversion from a color image to a monochrome image is performed, in adjacent pixels 50, if signals are different in terms of color image data but the signals become the same gray-scale signals when changed to monochrome image data, the gray-scale levels of the signals are changed to perform display.

According to a second method of the conversion, when the gray-scale levels of R, G, and B are DR, DG, and DB, respectively, in color image data, monochrome image data is obtained by the following equation:

monochrome image data $DM=0.33 \times DR+0.5 \times DG+ 0.17 \times DB$

For example, when (DR, DG, DB)=(100, 30, 30), monochrome image data $DM=0.33 \times 100+0.5 \times 30+0.17 \times 30=51$.

Also, when (DR, DG, DB)=(30, 100, 20), monochrome image data $DM=0.33 \times 30+0.5 \times 100+0.17 \times 20=63$.

According to a third method of the conversion, when conversion from a color image to a monochrome image is performed, the contour of the image is detected from color image data, and then, using the contour, data set to a different gray-scale level from the adjacent pixel is used as the monochrome image data.

According to any one of the above-mentioned methods, unlike a case in which signals for displaying color images are used to display monochrome images, it is possible to easily read displayed information in the monochrome images even when the equal luminances between adjacent pixels are equal or approximately equal to each other.

Second Embodiment

Figure 6:
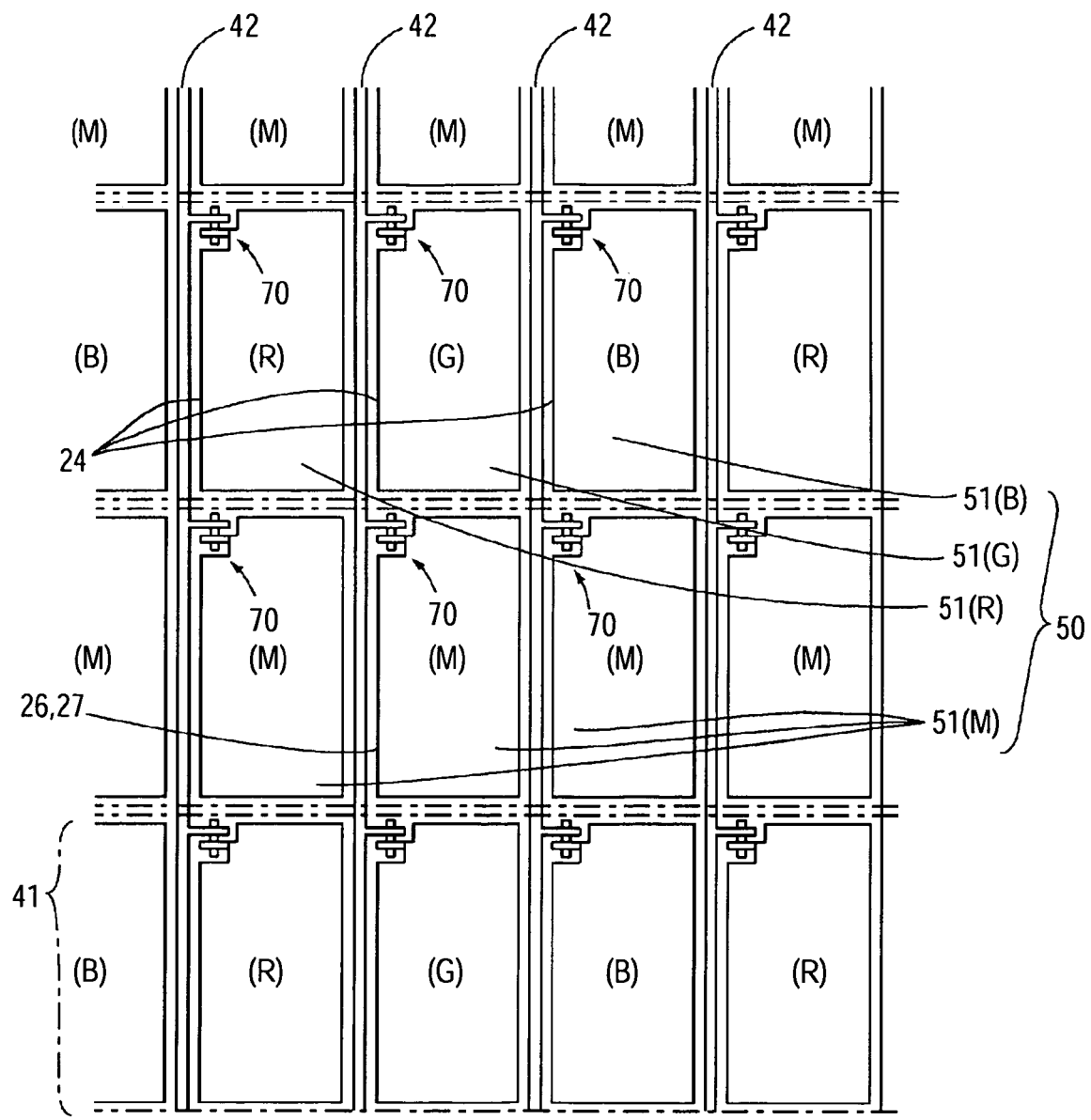
FIG. 6 is an explanatory view showing the configuration of a pixel in the electro-optical device according to a second embodiment of the invention.

FIG. 6 is an explanatory view showing a configuration of a pixel, in plan view, in an electro-optical device according to a second embodiment of the invention.

As shown in FIG. 6, in the electro-optical device according to the present embodiment, rows (X direction), on which three color-display sub-pixels 51(R), 51(G), and 51(B) are repeatedly arranged along the scanning line 41, and rows (X direction), on which monochrome-display sub-pixels 51(M) are arranged along the scanning line 41, are alternately arranged in a direction (Y direction) in which the data lines 42 are extended. The respective sub-pixels 51(R), 51(G), 51(B), and 51(M) have the same area. The configuration or operation of each sub-pixel 51(R), 51(G), 51(B), and 51(M) is the same as in the first embodiment and a detailed description thereof will thus be omitted herein.

Also in the present embodiment, the color-display sub-pixels 51(R), 51(G), and 51(B) display images in a transmissive mode in which light emitted from the backlight 6 is modulated, while the monochrome-display sub-pixel 51(M) display images in a reflective mode in which light incident from outside is modulated. Also, the sub-pixels 51(R), 51(G), 51(B), and 51(M) are respectively connected to the respective data lines 42 through the respective TFD elements 70. Accordingly, predetermined image data can be supplied to the sub-pixels 51(R), 51(G), 51(B), and 51(M), respectively. That is, in the pixel 50, different image signals can be supplied to the color-display sub-pixels 51(R), 51(G), and 51(B) and the monochrome-display sub-pixel 51(M), respectively. Also, since the respective sub-pixels 51(R), 51(G), 51(B), and 51(M) have the same sub-pixel area with respect to one TFD element 70, an equal capacitance ratio can be obtained both in the transmissive mode and in the reflective mode, and thus an equal driving voltage can be applied.

Third Embodiment

Figure 7:
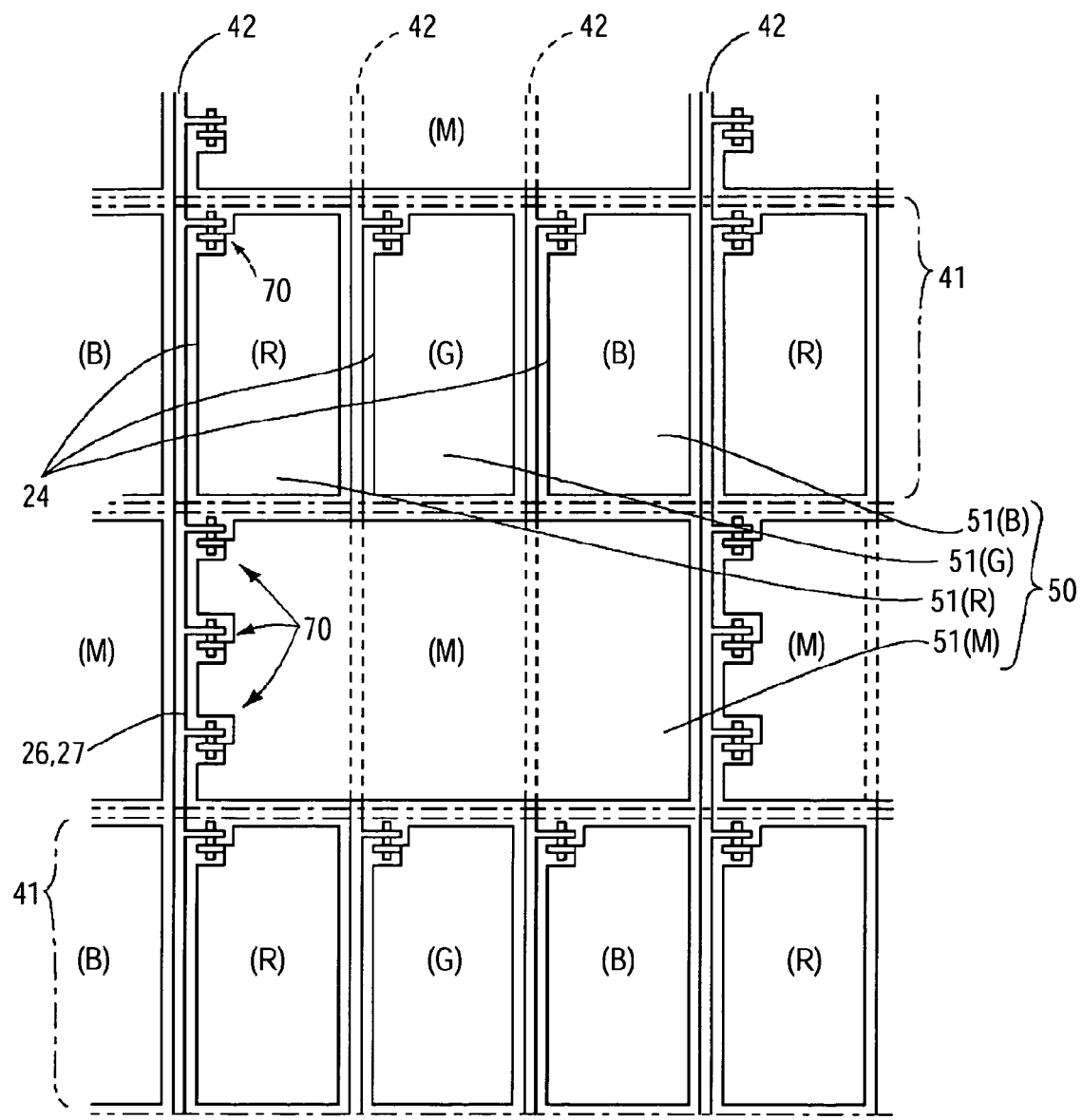
FIG. 7 is an explanatory view showing the configuration of a pixel in the electro-optical device according to a third embodiment of the invention.

FIG. 7 is an explanatory view showing a configuration of a pixel, in plan view, in an electro-optical device according to a third embodiment of the invention.

As shown in FIG. 7, in the electro-optical device according to the present embodiment, rows (x direction), on which three color-display sub-pixels 51(R), 51(G), and 51(B) are repeatedly arranged along the scanning line 41, and rows (X direction), on which monochrome-display sub-pixels 51(M) having an area three times as large as that of the sub-pixel 51(R), 51(G), and 51(B) are arranged along the scanning line 41, are alternately arranged in a direction (Y direction) in which the data lines 42 are extended. The respective sub-pixels 51(R), 51(G), and 51(B) have the same area. Also, the color-display sub-pixels 51(R), 51(G), and 51(B) are respectively connected to the data line 42 through a single TFD element 70, while the monochrome-display sub-pixel 51(M) is connected to the data line 42 through three TFD elements 70. Thus, the color-display sub-pixels 51(R), 51(G), and 51(B) and the monochrome-display sub-pixel 51(M) have the same number of TFD elements 70 with respect to an area of the sub-pixel. That is, the respective sub-pixels 51(R), 51(G), 51(B), and 51(M) have the same sub-pixel area with respect to one TFD element 70. The configuration or operation of each sub-pixel 51(R), 51(G), 51(B), and 51(M) is the same as in the first embodiment and a detailed description thereof will thus be omitted herein.

Also in the present embodiment, the color-display sub-pixels 51(R), 51(G), and 51(B) display images in a transmissive mode in which light emitted from the backlight 6 is modulated, while the monochrome-display sub-pixel 51(M) display images in a reflective mode in which light incident from outside is modulated. Further, the sub-pixels 51(R), 51(G), 51(B), and 51(M) are connected to the data lines 42 through the respective TFD elements 70, respectively. Accordingly, predetermined image data can be supplied to the sub-pixels 51(R), 51(G), 51(B), and 51(M), respectively. That is, in the pixel 50, different image signals can be supplied to the color-display sub-pixels 51(R), 51(G), 51(B) and the monochrome-display sub-pixel 51(M), respectively.

Further, the respective sub-pixels 51(R), 51(G), and 51(B) are electrically connected to the data line 42 through the single TFD element 70, while the sub-pixel 51(M) is electrically connected to the data line 42 through three TFD elements 70 since it has an area three times as large as that of each of the sub-pixels 51(R), 51(G), and 51(B). The respective sub-pixels 51(R), 51(G), 51(B), and 51(M) are equal to each other in an area of the sub-pixel with respect to one TFD element 70. Accordingly, since an equal capacitance ratio can be obtained in the transmissive mode and the reflective mode, an equal driving voltage can be applied.

Other Embodiments

Although the counter substrate 30 is provided at a side to which display light is emitted and the element substrate 20 is provided at the opposite side in the above embodiments, the element substrate 20 may be provided at the side to which the display light is emitted and the counter substrate 30 may be provided at the opposite side. In this case, both the color filter and the reflective layer are formed on the counter substrate 30. Also, although a corresponding color filter layer is not provided in the monochrome-display sub-pixel in the above embodiments, a corresponding a single-colored color filter layer, such as a green color filter layer, may be provided in the monochrome-display sub-pixel.

Also, although an electro-optical device having a liquid crystal panel using a TFD element as an active element has been described in the above embodiments, the invention may be applied to an electro-optical device having a liquid crystal panel using a TFT as an active element. Also, the invention is preferably applied to a liquid crystal display device serving as an electro-optical device. Also, the invention may be applied to an in-plane switching (IPS) mode liquid crystal display device. Also, although the color-display sub-pixels are provided to correspond to red (R), green (G), and blue (B) in the above embodiments, they may be provided to correspond to yellow, cyan, and magenta.

Electronic Apparatus Equipped with Electro-Optical Device

Figure 8A:
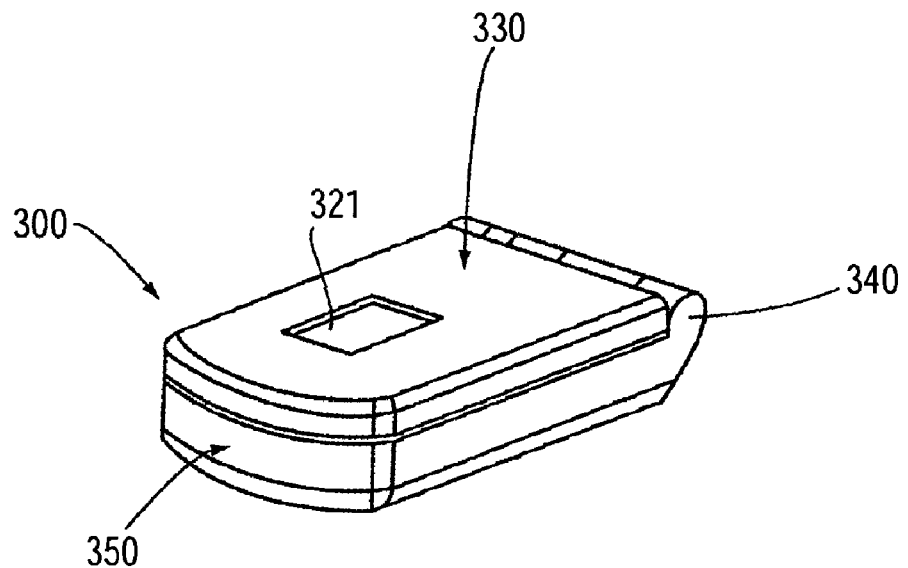
FIG. 8A is an explanatory view showing an open state of a flip-type mobile phone, which is an example of an electronic apparatus according to the invention.
Figure 8B:
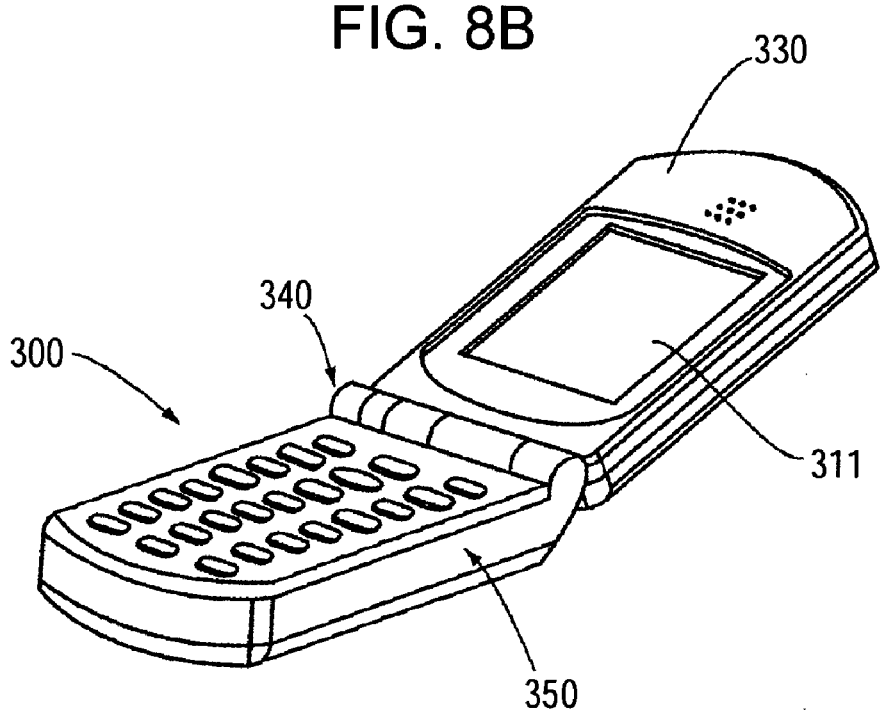
FIG. 8B is an explanatory view showing a closed state of a flip-type mobile phone, which is an example of the electronic apparatus according to the invention.

FIGS. 8A and 8B are explanatory views showing an open state and a closed state of a flip-type mobile phone, which is an example of an electronic apparatus to which the invention is applied.

The electro-optical device to which the invention is applied is, for example, used in a mobile phone 300 shown in FIGS. 8A and 8B. In the mobile phone 300, a cover 330 is rotatably connected to a main operation body 350 through a hinge 340. The mobile phone 300 includes a main display part 311 provided inside the cover 330 to display an image when the cover 330 is open, and a sub-display part 321 provided outside the cover 330 to display an image when the cover 330 is closed. For example, the electro-optical device according to the invention constituting the main display part 311 can be applied to the flip-type mobile phone 300.

Also, the electro-optical device 1 can be used in various electronic apparatuses, such as mobile computers, digital cameras, movie cameras, in-vehicle devices, audio devices, projectors, in addition to the mobile phone.

What is claimed is:

1. An electro-optical device, comprising:
   pixels arranged in a matrix, each pixel including a plurality of color-display sub-pixels corresponding to a plurality of colors and a monochrome-display sub-pixel, each color-display sub-pixel including a color filter,
   a planarization film disposed in the color-display sub-pixels and in the monochrome display sub-pixel and including a smaller thickness in the color display sub-pixels than in the monochrome display sub-pixel;
   a liquid crystal layer having a larger thickness in the color-display sub-pixels than in the monochrome display sub-pixel,
   an insulation film disposed below the liquid crystal layer in the color display sub-pixels and in the monochrome display sub-pixel, the insulation film having a substantially uniform surface opposing the liquid crystal layer in the color-display sub-pixels and having an uneven surface opposing the liquid crystal layer in the monochrome display sub-pixel;
   a reflective layer disposed in the monochrome display sub-pixel and positioned on the uneven surface of the insulation film, between the liquid crystal layer and the insulation film, and without a filter provided in an area opposite to the reflective layer, the reflective layer including an uneven surface defining a series of peaks and valleys operable to scatter light in a plurality of directions;
   a transmissive upper electrode disposed on the reflective layer between the liquid crystal layer and the reflective layer, the transmissive upper electrode including an uneven surface defining a series of peaks and valleys substantially aligned with the peaks and valleys of the reflective layer; and
   an alignment film disposed on the transmissive upper electrode between the liquid crystal layer and the transmissive upper electrode, the alignment film including an uneven surface defining a series of peaks and valleys substantially aligned with the peaks and valleys of the transmissive layer and the peaks and valleys of the reflective layer;
   wherein the color-display sub-pixels and the monochrome-display sub-pixel perform gray-scale display independently,
   the color-display sub-pixels display an image only in a transmissive mode, and the monochrome display sub-pixel displays an image only in a reflective mode.

2. The electro-optical device according to claim 1, wherein, in each pixel, different image signals are supplied to the color-display sub-pixels and the monochrome-display sub-pixel, respectively.

3. The electro-optical device according to claim 1, wherein the sub-pixels are electrically connected to signal lines through pixel switching elements, respectively, and the respective sub-pixels have the same sub-pixel area per switching element.

4. The electro-optical device according to claim 1, wherein the color-display sub-pixels and the monochrome-display sub-pixel are electrically connected to signal lines through pixel switching elements, respectively, and one of the color-display sub-pixels and the monochrome-display sub-pixel are equal in the number of switching elements per unit sub-pixel area.

5. The electro-optical device according to claim 1, wherein, in the pixel, among four sub-pixels arranged in a lattice shape, three sub-pixels are the color-display sub-pixels and the remaining one sub-pixel is the monochrome-display sub-pixel.

6. The electro-optical device according to claim 1, wherein, in the pixel, a row on which the three color-display sub-pixels are arranged and a row on which the monochrome-display sub-pixels are arranged are provided parallel to each other.

7. An electronic apparatus comprising the electro-optical device according to claim 1.

* * * * *